(12) United States Patent
Pascal et al.

(10) Patent No.: US 6,376,586 B1
(45) Date of Patent: Apr. 23, 2002

(54) FLEXIBLE AND TOUGH POLY(VINYLIDENE FLUORIDE)-BASED COMPOSITIONS AND THEIR METHOD OF PREPARATION

(75) Inventors: Thierry Pascal, Charly; Bruno Schlund, Chaponost, both of (FR)

(73) Assignee: Elf Atochem, S.A., Puteaux (FR)

( * ) Notice: Subject to any disclaimer, the term of this patent is extended or adjusted under 35 U.S.C. 154(b) by 0 days.

(21) Appl. No.: 09/095,608

(22) Filed: Jun. 11, 1998

(30) Foreign Application Priority Data

Jun. 12, 1997 (FR) .............................. 97 07279

(51) Int. Cl.⁷ .............................. C08K 5/48; C08K 5/11
(52) U.S. Cl. .............................. 524/225; 524/314
(58) Field of Search ................. 524/314, 225

(56) References Cited

U.S. PATENT DOCUMENTS

| | | | | |
|---|---|---|---|---|
| 2,476,606 A | * | 7/1949 | Johnston et al. | 524/314 |
| 3,169,120 A | * | 2/1965 | Capren et al. | 524/314 |
| 3,264,373 A | | 8/1966 | Whitworth, Jr. | |
| 3,541,039 A | | 11/1970 | Whiton | |
| 3,562,235 A | | 2/1971 | Ryan | |
| 3,753,937 A | * | 8/1973 | Stivers | 524/314 |
| 4,183,837 A | * | 1/1980 | Tamura et al. | 524/314 |
| 4,584,215 A | * | 4/1986 | Bré et al. | 524/314 |
| 4,737,535 A | * | 4/1988 | Furukawa et al. | 524/314 |
| 5,006,602 A | | 4/1991 | Guerin et al. | |
| 5,700,859 A | * | 12/1997 | Ogura et al. | 524/314 |

FOREIGN PATENT DOCUMENTS

| | | | | |
|---|---|---|---|---|
| CA | 488892 | * | 12/1952 | ............... 524/314 |
| EP | 301949 | | 2/1989 | |
| EP | 608939 | | 8/1994 | |
| EP | 608940 | | 8/1994 | |
| EP | 671502 | | 9/1995 | |
| EP | 671746 | | 9/1995 | |
| EP | 709429 | | 5/1996 | |
| EP | 714944 | | 6/1996 | |
| FR | 2286153 | | 4/1976 | |
| FR | 2592655 | | 7/1987 | |
| FR | 2610325 | | 8/1988 | |
| FR | 2618791 | | 2/1989 | |

OTHER PUBLICATIONS

French Search Report dated Feb. 3, 1998.

* cited by examiner

*Primary Examiner*—Peter D. Mulcahy
(74) *Attorney, Agent, or Firm*—Smith, Gambrell & Russell LLP

(57) ABSTRACT

The invention relates to felxible and tough poly(vinylidene fluoride)-based compositions. They comprise from 0.5 to 10 parts by weight of an elastomer B and from 0.5 to 10 parts by weight of a plasticizer C per 100 parts by weight of a homopolymer (A) of vinylidene fluoride (VF2) or of a copolymer (A) of VF2 and of at least one other monomer copolymerizable with VF2, in which the said monomer is present in an amount of between 0 and 30 parts by weight per 100 parts by weight of VF2 with the additional condition that the sum of B and C is from 1 to 10.5 parts by weight and, on the other hand, in that the homopolymer or the copolymer of vinylidene fluoride, A, is chosen in such a way that it has a melt flow index, measured according to the ISO 1133 standard at 230° C. under a load of 5 kg, of less than 5 g/10 min and a critical modulus $G_C$, at the intersection of the melt shear moduli G' and G" measured at 190° C., of between 5 and 22 kPa. In general, they are suitable for producing objects and articles such as sheets, films, sleeves for tubes, pipes, etc., in contact with particularly aggressive substances (such as hydrocarbons, strong acids, solvents, inorganic and organic bases) during which their toughness and flexibility properties are particularly required. (Petroleum and oil industries, chemical engineering, building and civil engineering industries).

7 Claims, No Drawings

FLEXIBLE AND TOUGH POLY(VINYLIDENE FLUORIDE)-BASED COMPOSITIONS AND THEIR METHOD OF PREPARATION

FIELD OF THE INVENTION

The present invention relates to the field of polymers and the subject of the invention is compositions based on fluorinated polymer(s) and their method of preparation.

BACKGROUND OF THE INVENTION

Fluorinated homopolymers and copolymers are known for their good thermal withstand capability, their chemical resistance, especially to solvents, weatherability and resistance to radiation (UV, etc.), their impermeability to gases and to liquids, and their property of being electrical insulants. They are used in particular for the production of pipes for conveying hydrocarbons extracted from off-shore or on-shore oil deposits. The hydrocarbons are sometimes transported at high temperatures (of about 135° C.) and at a high pressure (for example 70 MPa). Severe problems therefore arise, during operation of installations, relating to the mechanical, thermal and chemical resistance of the materials employed. Other requirements are added to them before or after service: thus, during their production, their installation and/or their removal (reeling/unreeling), the pipes may be subjected to impacts and to flexural loads which they must also withstand and, sometimes, they must do so at particularly low temperatures (for example −35° C.).

In order to try to meet these short-term and long-term requirements, various types of materials have been proposed, generally comprising one or more metallic components which guarantee mechanical rigidity, for example a spiralled steel tape, as well as various layers based on polymeric compositions, which in particular provide impermeability and thermal insulation. These compositions, often based on semicrystalline fluorinated polymers, especially poly(vinylidene fluoride) (PVDF), are often plasticized in order to remedy a lack of flexibility, a low elongation at the yield point and an insufficient toughness, this having the drawback of the plasticizers being extracted relatively rapidly by the hydrocarbons transported, gradually resulting in a loss of the properties provided by the plasticization (flexibility, toughness, etc.), being accompanied in general by shrinkage phenomena and consequently limiting the lifetime of the articles based on these compositions.

In order to solve some of these problems, the optionally plasticized fluorinated polymers have been replaced by polymeric compositions comprising a PVDF homopolymer, a thermoplastic copolymer of vinylidene fluoride (VF2) and of at least one other fluorinated monomer (EP 608,939 and EP 608,940) and a plasticizer (EP 608,939). However, strict and precise control of the morphology of such blends demands the use of complex and expensive apparatus which therefore makes this technical solution not easily realisable; moreover, it is found that these blends have a limited toughness at low temperature and a poor swelling resistance, for example when in contact with hydrocarbons, and a chemical withstand capability which is inferior to that of PVDF by itself, and any plasticizer is extracted when in contact with certain chemicals.

Elastomeric particles have also been incorporated into PVDF (FR 2,592,655 and FR 2,618,791) for the purpose of absorbing the hydrocarbons and of fixing them throughout the blend, the proportion of elastomer within the blend having not to exceed 25% of the total mass. Such blends have improved toughness over PVDF alone, but their flexibility is insufficient for certain applications envisaged, especially for the transportation and/or storage of hydrocarbons, as this type of blend is not very flexible when not in direct contact with the hydrocarbons. FR 2,592,655 has described blends containing, in addition, at least 10% by weight of plasticizer, which, although they possess both the desired flexibility and the desired impact strength, sooner or later let the plasticizer exude.

Patent Application EP 0,714,944 describes compositions comprising a PVDF matrix in which are dispersed nodules of vulcanized elastomers which are optionally flexibilized by plasticizers. The multiaxial impact strength of these compositions is very good, but the amount of elastomer, 26.6 or 50 parts by weight per 100 parts by weight of PVDF 1000 (Examples 6 and 11), is so high that these compositions lack thermal and chemical stability at 150° C. In addition, these compositions have the drawback of a high permeability under pressure and a poor resistance to the rapid decompression of hot pressurized gases ("blistering").

DESCRIPTION OF THE INVENTION

The present invention aims to solve the abovementioned technical problems and the subject of the invention is a flexible and tough composition comprising:

at least one homopolymer (A) of vinylidene fluoride (VF2) or a copolymer (A) of VF2 and of at least one other monomer copolymerizable with VF2, in which the said monomer is present in an amount of between 0 and 30 parts by weight per 100 parts by weight of VF2, at least one elastomer B, at least one plasticizer C, characterized in that, on the one hand, the said composition comprises from 0.5 to 10 parts by weight of B and from 0.5 to 10 parts by weight of C per 100 parts by weight of A, with the additional condition that the sum of B and C is from 1 to 10.5 parts by weight and, on the other hand, in that the homopolymer or the copolymer of vinylidene fluoride, A, is chosen in such a way that it has a melt flow index, measured according to the ISO 1133 standard at 230° C. under a load of 5 kg, of less than 5 g/10 min and a critical modulus $G_C$, at the intersection of the melt shear moduli G' and G" measured at 190° C., of between 5 and 22 kPa, the said composition having the following properties:

an elongation at the yield point, $\epsilon_y$, of greater than 11%, an elongation at break $\epsilon_b$ of greater than 200%, an impact strength at 23° C. of greater than 50 kJ/m² and an impact strength at −30° C. of greater than 10 kJ/m², these being measured according to the ISO 180-1982 standard, a resistance to flexural rupture on a sleeved metal tape of greater than 50%, a weight loss Δw in air at 150° C. for 1 month of less than or equal to 8% and a weight change Δp in petroleum (equal-volume mixture of cyclohexane, isooctane and xylene) at 150° C. for 1 month which is not negative (the said composition does not lose weight in petroleum).

The critical modulus $G_C$ is determined at 190° C. using a dynamic mechanical spectrometer, for example of the Rheometrics RMS 800 type, using a 25 mm diameter plane—plane viscometer.

Preferably, the said other monomer is present in a relative amount of between 0 and 5 parts by weight.

Preferably, the said other monomer is a fluorinated monomer.

Advantageously, B is present in a relative amount of from 0.5 to 5 parts by weight per 100 parts by weight of A.

Advantageously, C is present in a relative amount of from 0.5 to 5 parts by weight per 100 parts by weight of A.

The fluorinated polymers A of the compositions according to the invention are chosen from homopolymers or copolymers of VF2 because of their excellent chemical inertness in the presence of crude gas or petroleum and because of their high-temperature stability.

Preferably, the compositions according to the invention comprise 100 parts by weight of vinylidene fluoride homopolymer, 2.1 parts by weight of B and 3.2 parts by weight of C, the homopolymer being chosen so as to have an MFI measured at 230° C., of 0.7 and a critical modulus $G_C$, measured at 190° C., of 20 kPa.

Advantageously; with regard to the latter compositions, B is an acrylic elastomer and C is dibutyl sebacate.

The elastomers B which can be used in the context of the invention may be chosen from true elastomers and thermoplastic elastomers (TPEs). True elastomers or rubbers, whether natural or synthetic, are defined by the ASTM, Special Technical Bulletin No. 184 standard as materials capable of being drawn, at room temperature, up to twice their natural length and which, once released after being held under tension for 5 minutes, recover, to within 10, their initial length in the same time. TPEs have an elongation at the yield point of greater than 15%. TPEs lie between thermoplastic resins, with easy and varied processing but with limited temperature properties or limited properties in the dynamic domain, and elastomers with remarkable elastic properties, but whose processing is expensive, complex and often polluting. The structure of TPEs is always composed of two incompatible phases, one of them resembling the thermoplastic blocks dispersed in the elastomer phase. In general, 5 categories of TPE may be distinguished:

- thermoplastic polyolefin (TPO) elastomers are physical blends based on polyolefins. A distinction may be made between those which contain more than 60% of polypropylene and those whose elastomer phase is predominant (greater than 70%), it being possible for the latter to be crosslinked or uncrosslinked,
- polystyrene-based block copolymers, the hard phase of which consists of polystyrene blocks, it being possible for the soft phase to be formed, for example, by polybutadiene blocks (SBS), polyisoprene blocks (SIS) or poly(ethylene-butylene) blocks (SEBS),
- block copolymers based on polyurethane (TPUs) which may be obtained by the conjoint reaction of a diol of high molecular mass, which constitutes the soft crystallizable block of the TPE, with a diisocyanate and a diol of low molecular mass which generate the hard block,
- polyester-based block copolymers such as those obtained by the copolymerization of a polybutylene (PBT) or of a polyethylene terephthalate (PET) which constitutes the hard crystalline blocks and of a glycol of low molecular weight (butanediol, diethylene glycol) which, combined with a polyalkylene ether glycol, forms the crystallizable soft block,
- polyamide-based block copolymers such as those in which the hard blocks consist of polyamide (PA) and the crystallizable soft blocks of polyether, these also being called polyetheramides, as well as polyesteramides.

The elastomers and TPEs may advantageously be chosen from natural rubbers, polyurethanes, ethylene-propylene-maleicized diene copolymers (EPDM), acrylonitrile-butadiene-styrene copolymers (ABS), methyl methacrylate-butadiene-styrene copolymers (MBS), polyamide-based block copolymers (polyetheramides, polyesteramides, polyetheresteramides), ethylene-carbon monoxide copolymers, acrylic rubbers, especially core-shell particles with a polyacrylic skin, SBS, SIS, ethylene-ethyl acrylate copolymers, ethylene-ethyl acetate copolymers, ethylene-vinyl acetate copolymers, as well as their terpolymers.

Preferably, the elastomer B is chosen from methyl methacrylate-butadiene-styrene copolymers (MBS) and acrylic rubbers.

Advantageously, the acrylic rubber is in the form of core-shell particles with a polyacrylic skin.

The plasticizers C may be chosen from the usual plasticizers and especially those described in U.S. Pat. No. 3,541,039 and U.S. Pat. No. 4,584,215. Preferably, the plasticizer is chosen from dibutyl sebacate and N-n-butylsulphonamide.

Apart from the constituents A, B and C described above, the compositions according to the invention may contain various organic or inorganic, macromolecular or non-macromolecular additives and/or fillers and/or colorants and/or pigments well known in the literature.

By way of non-limiting examples of fillers, mention may be made of mica, alumina, talc, carbon black, glass fibres, carbon fibres and macromolecular compounds.

By way of non-limiting examples of additives, mention may be made of UV stabilizers, fire retardants, heat stabilizers and processing aids.

The sum of these various additives and fillers generally represents less than 20% of the total mass A+B+C.

Advantageously, the preparation of the compositions according to the invention is carried out by melt blending the components A, B and C.

The composition according to the invention may be prepared by melt blending the vinylidene homopolymer or copolymer A with the elastomer or elastomers B—initially in the form of powders or granules—in an extruder, a multiple-roll mixer or any type of suitable mixing apparatus.

It is also possible to blend a latex of a vinylidene homopolymer or copolymer with the elastomer or elastomers in powder or latex form.

The plasticizer or plasticizers together with the optional additives may be incorporated into the compositions during the blending of A and B, or are blended with one or other of these constituents prior to the step of blending A and B, or after blending A and B using the mixing techniques mentioned above.

The compositions according to the invention may be used for producing materials exposed to stresses under high-temperature and/or low-temperature conditions, in contact with particularly aggressive substances (such as hydrocarbons, strong acids, solvents, inorganic and organic bases) during which their toughness and flexibility properties are particularly required.

As indicated above, the compositions according to the invention are particularly suitable for manufacturing the impermeable sleeves of flexible metal pipes for the extraction and/or transportation of gases and hydrocarbons in the oil and gas industries.

These impermeable sleeves are generally in the form of monolayer or multilayer tubes, manufactured by extrusion or coextrusion, into which the flexible metal pipe is then inserted, or else they are formed directly around the flexible pipe using the standard overjacketing techniques.

The composition according to the invention may be used in multilayer impermeable sleeves such as those described, for example, in U.S. Pat. No. 5,601,893.

The compositions according to the invention are also well suited for producing, by extrusion, chemical engineering components, especially in the form of pipes and tubes, as well as for producing objects in the civil engineering and building industries, such as cable sheaths, stays, as well as monolayer or multilayer films and sheets for any kind of industry.

The composition according to the invention may also be used in sleeves of wires, ropes, cables and stays, such as those described in Patent Applications EP 671,502 and EP 671,746.

EXAMPLES

Compositions (Ai Bj Ck x), containing at least one of the 7 fluorinated polymers A1 to A7, one of the 4 elastomers B1 to B4 and one of the 2 plasticizers C1 and C2, are extruded using a 40 mm diameter single-screw extruder (L/D=33; compression ratio=3.5) regulated at 220° C. Depending on the respective proportions of the various constituents, the compositions are labelled α to η.

Table 1 gives the melt flow index of the fluorinated polymers Ai which are VF2 homopolymers or a VF2 copolymer as well as their critical modulus; the melt flow index MFI is measured according to the ISO 1133 standard at 230° C. under a load of 5 kg and the critical modulus $G_C$ is determined at 190° C. by means of a dynamic mechanical spectrometer, for example of the Rheometrics RMS 800 type, using a 25 mm-diameter plane—plane viscometer.

Table 2 gives the chemical nature, trade name and suppliers of the elastomers Bj.

Table 3 gives the chemical nature and the family to which the plasticizers Ck belong; Table 4 gives the proportions by weight of constituents of the compositions illustrated and the reference symbol of the corresponding compositions.

acrylonitrile partially hydrogenated in order to increase its thermal stability.

TABLE 3

| Plasticizer No. | Plasticizer type | Nature |
|---|---|---|
| C1 | Ester | Dibutyl sebacate (DBS) |
| C2 | Sulphonamide | N-n-butyl-sulphonamide (BBSA) |

TABLE 4

| Composition No. | % fluorinated polymer | % elastomer | % plasticizer |
|---|---|---|---|
| α | 95.5 | 2 | 2.5 |

TABLE 1

| | Comparative examples | | | | Examples according to the invention | | |
|---|---|---|---|---|---|---|---|
| Nature of the polymer | VF2 homopolymer | VF2 homopolymer | VF2 homopolymer | VF2 homopolymer | VF2 homopolymer | VF2 homopolymer | VF2 copolymer with 1% by weight of $C_2F_3Cl$ |
| Fluorinated polymer No. | A1 | A2 | A3 | A4 | A5 | A6 | A7 |
| MFI (g/10 min) | 12 | 0.4 | 2 | 0.7 | 0.14 | 0.15 | 0.8 |
| $G_c$ (kPa) | 71 | 23 | 24 | 20 | 11 | 10 | 21 |

The VF2 homopolymers or copolymers were prepared by the conventional emulsion or suspension radical polymerization processes as described in Patent Applications EP 709,429, FR 2,286,153 and FR 2,610,325. They may also be prepared by solution or bulk polymerization.

TABLE 2

| Elastomer No. | Nature of the elastomer | Trade name | Supplier |
|---|---|---|---|
| B1 | Acrylic elastomer | Durastrength ® D 200 | Ceca (France) |
| B2 | Acrylic elastomer | Paraloid ® E 653 | Röhm & Haas |
| B3 | Silicone elastomer | Metablen S 2001 | Mitsubishi or Elf Atochem S.A. |
| B4 | NBR rubber | Therban ® 1907 | Bayer |

More specifically, the elastomer B1 is prepared by radical polymerization in aqueous phase of acrylic monomers according to U.S. Pat. No. 3,264,373 or U.S. Pat. No. 3,562,235.

The elastomer B2 is obtained by radical polymerization in aqueous phase and is composed of a predominant phase consisting of a methyl methacrylate-butadiene-styrene copolymer (MBS) and of a polyacrylate-based phase.

The elastomer B3 is composed of two interpenetrating polymer phases—one being based on a polyacrylate and the other based on a silicone polymer.

The elastomer B4 is obtained by emulsion radical polymerization. This is a copolymer of butadiene and of TABLE 4-continued

| Composition No. | % fluorinated polymer | % elastomer | % plasticizer |
|---|---|---|---|
| β | 96 | 1.5 | 2.5 |
| χ | 93.5 | 4 | 2.5 |
| δ* | 90 | 0 | 10 |
| ε* | 90 | 10 | 0 |
| φ | 90 | 5 | 5 |
| γ* | 98 | 2 | 0 |
| η* | 96 | 4 | 0 |

*Comparative compositions outside the invention.

The compositions presented above are tested by measuring the tensile strength, the Izod impact strength, the flexural resistance on a sleeved metal tape and the thermal and chemical stability.

The tensile elongation is measured on plaques 0.7 mm thick which are prepared from the extruded compositions described above and moulded at 205° C. using a platen press. Tensile test pieces of the ASTM D 1708 type are cut out from the said plaques using a die cutter. The tensile elongation (elongation at the yield point $\epsilon_y$ and the elongation at break $\epsilon_b$) is measured according to the ASTM D 638 standard at room temperature.

The Izod notched impact strength (measured at 23° C. and at −30° C.) is measured on test pieces injection-moulded at 230° C. having the dimensions 80×10×4 mm, the notch and the test protocol being in accordance with the ISO 180-1982 standard.

The flexural resistance on a sleeved metal tape is evaluated at room temperature on a flexible metal structure (interlocked steel tape having an external diameter of 29 mm) which is sleeved with the illustrated compositions extruded using a crosshead; the sleeve has an average thickness of 4 mm, the extrusion temperature during sleeving being between 200 and 250° C. The tube thus sleeved is placed on two stationary supports 250 mm apart. An 80 mm-diameter bending wheel is applied against the tube at an equidistance from the support points, exerting a pressure sufficient to cause the tube to flex until it ruptures. The depth of penetration of the wheel, which is an indication of the deformability of the flexible tube, is measured. The ratio of the penetration depth measured at rupture to a fixed maximum penetration depth of 160 mm corresponds to the flexural resistance on a sleeved metal tape.

The thermal and chemical stability is assessed by measuring the weight change $\Delta w$ between a 3 mm-thick extruded specimen, of mass 5 g, of a given composition and an identical specimen placed for 1 month at 150° C. in a given medium (air or petroleum [containing, by volume, ⅓ cyclohexane, ⅓ isooctane and ⅓ xylene]), the tensile elongation ($\epsilon_y$ and $\epsilon_b$) of which is also measured. A—sign (negative number) corresponds to a weight loss.

The chemical stability is assessed by measuring the weight change $\Delta w$ between a 3 mm-thick extruded specimen, of mass 5 g, of a given composition and an identical specimen placed for 7 days at 50° C. in a concentrated (37% by weight) HCl solution, then rinsed in distilled water and oven-dried for 24 h at 150° C. A—sign (negative number) corresponds to a weight loss.

All the results are given in Table 5.

The preferred composition for the manufacture of pipes intended for the flow of liquid hydrocarbons is, in Table 5 below, the composition No. 5: A4 B1 C1 α.

art in light of the foregoing description. Accordingly, the invention is intended to embrace all of the alternatives and variations that fall within the spirit and scope of the appended claims. The above references are hereby incorporated by reference.

What is claimed is:

1. A flexible, tough polymer composition, comprising:
   a) a polymer A, being at least one of:
      i) at least one homopolymer of vinylidene fluoride (VF2), and
      ii) a copolymer of VF2 and at least one other monomer copolymerizable with VF2, in which the at least one other monomer is present in an amount of between 0 and 30 parts by weight per 100 parts by weight of VF2;
   b) at least one elastomer B, present in an amount from 1.5 to 5 parts by weight per 100 parts by weight of A; and
   c) at least one plasticizer C, present in an amount from 2.5 to 5 parts by weight of C per 100 parts by weight of polymer A, the plasticizer being selected from the group consisting of dibutyl sebacate and N-n-butylsulphonamide; wherein the sum of elastomer B and plasticizer C comprises from 4 to 10 parts by weight per 100 parts by weight of polymer A, wherein the polymer A has a melt flow index, according to the ISO 1133 standard at 230° C. under a load of 5 kg, of from about 0.14 to about 0.8 g/10 minutes, and a critical modulus $G_C$, at the intersection of the melt shear moduli G' and G" measured at 190° C., of between 10 and 21 kPa, and wherein the flexible, tough polymer composition has the following properties:
   a resistance to flexural rupture on a sleeved metal tape of greater than 70%;
   a weight loss $\Delta w$ in air at 150° C. for 1 month of less than or equal to 8% and a weight change $\Delta p$ in

TABLE 5

| | Composition | | | Tensile elongation | | Impact strength | | Flexural resistance on tape | Stability in air | | | Stability in petroleum | | | Stability in HCL |
|---|---|---|---|---|---|---|---|---|---|---|---|---|---|---|---|
| | | | | $\epsilon_y$ | $\epsilon_b$ | -30° C. | 23° C. | 23° C. | $\Delta w$ | $\epsilon_y$ | $\epsilon_b$ | $\Delta w$ | $\epsilon_y$ | $\epsilon_b$ | $\Delta w$ |
| No. | Nature | | | (%) | (%) | (kJ/m²) | (kJ/m²) | (%) | (%) | (%) | (%) | (%) | (%) | (%) | (%) |
| 1 | A1 | | 100* | 10.5 | 120 | 8 | 18 | 22 | | | | | | | |
| 2 | A5 | C1 | δ* | 24 | 450 | 15 | 50 | 100 | -10 | 11 | 245 | -6.3 | >25 | 220 | -9.5 |
| 3 | A5 | B1 | ε* | 10 | 350 | 16 | 110 | | -8.5 | 10 | 250 | 7 | 33 | 420 | -9 |
| 4 | A5 B1 | C1 | φ | 14.8 | 380 | 22 | 98 | 100 | -4.8 | 16 | 280 | 3.3 | >25 | 300 | -6 |
| 5 | A4 B1 | C1 | α | 13 | 350 | 15 | 68 | 80 | -2.6 | 15.3 | 260 | 1.3 | 22 | 255 | -4 |
| 6 | A5 B1 | C1 | α | 11.7 | 400 | 24 | 70 | 85 | -2.5 | 13.1 | 350 | 1.3 | 20 | 340 | -4 |
| 7 | A5 B1 | C2 | α | 11.5 | 380 | 22 | 65 | 80 | | | | | | | |
| 8 | A5 B2 | C1 | α | 12.4 | 420 | 19 | 70 | 75 | -2.3 | 13 | 330 | 2.9 | 20 | 320 | -4 |
| 9 | A5 B3 | C1 | α | 13.5 | 320 | 22 | 86 | 76 | | | | | | | |
| 10 | A5 B4 | C1 | α | 11.5 | 300 | 20 | 68 | 70 | | | | | | | |
| 11 | A5 B1 | C1 | α | 13.2 | 390 | 22 | 63 | 70 | | | | | | | |
| 12 | A5 B1 | C1 | χ | 12.5 | 310 | 19 | 92 | 78 | | | | | | | |
| 13 | A5 B1 | | γ* | 7.7 | 280 | 17 | 60 | | | | | | | | |
| 14 | A5 B1 | | η* | 7.7 | 340 | 14 | 79 | | | | | | | | |
| 15 | A2 B1 | C1 | α* | 10.5 | 350 | 14 | 31 | 32 | | | | | | | |
| 16 | A3 B1 | C1 | α* | 11 | 200 | 14 | 41 | 42 | | | | | | | |
| 17 | A6 B1 | C1 | α | 12.3 | 330 | 15 | 58 | 81 | | | | | | | |
| 18 | A5 | | 100* | 8 | 290 | 5 | 27 | | | | | | | | |
| 19 | A7 B1 | C1 | α | 15 | 350 | 25 | 100 | 80 | -4.7 | 16 | 270 | 3.5 | >25 | 300 | -7 |

*Comparative compositions outside the invention

Although the invention has been described in conjunction with specific embodiments, it is evident that many alternatives and variations will be apparent to those skilled in the petroleum (an equal-volume mixture of cyclohexane, isooctane and xylene) at 150° C. for 1 month which is not negative;

an elongation at the yield point, $\epsilon_Y$, of greater than 11%, according to the ISO 180-1982 standard;

an elongation at break Eb of greater than 200%, according to the ISO 180-1982 standard;

an impact strength at 23° C. of greater than 50 kJ/m², according to the ISO 180-1982 standard; and an impact strength at −30° C. of greater than 10 kJ/m², according to the ISO 180-1982 standard.

2. The flexible, tough polymer composition according to claim 1, wherein the other monomer is present in an amount of between 0 and 5 parts by weight per 100 parts by weight of polymer A.

3. The flexible, tough polymer composition according to claim 1, wherein the at least one other monomer comprises a fluorinated monomer.

4. The flexible, tough polymer composition according to claim 1, wherein the elastomer B is a thermoplastic elastomer selected from methyl methacrylate-butadiene-styrene (MBS) copolymers and acrylic rubbers.

5. The flexible, tough polymer composition according to claim 4, wherein the acrylic rubber comprises core-shell particles with a polyacrylic skin.

6. The flexible, tough polymer composition according to claim 1, comprising 100 parts by weight vinylidene fluoride homopolymer, 2.1 parts by weight elastomer B, and 3.2 parts by weight plasticizer C, the vinylidene fluoride homopolymer having an MVI measured at 230° C. of 0.7, and a critical modulus $G_C$, measured at 190° C., of 20 kPa.

7. The flexible, tough polymer composition according to claim 6, wherein the elastomer B is an acrylic elastomer and the plasticizer C is dibutyl sebacate.

* * * * *